R. VOSE.

Car-Spring.

No. { 113, 1,217½. } Reissued Aug. 6. 1861.

Witnesses
Z C Robbins
Grenville Lewis

Richard Vose

UNITED STATES PATENT OFFICE.

RICHARD VOSE, OF NEW YORK, N. Y.

IMPROVED CAR-SPRING.

Specification forming part of Letters Patent No. 28,619, dated June 5, 1860; Reissue No. 1,217½, dated August 6, 1861.

*To all whom it may concern:*

Be it known that I, RICHARD VOSE, of the city, county, and State of New York, have invented a new and Improved Car-Spring; and I do hereby declare that the following is a full and exact description thereof, reference being had to the accompanying drawings, which form a part of this specification.

Figure 1:
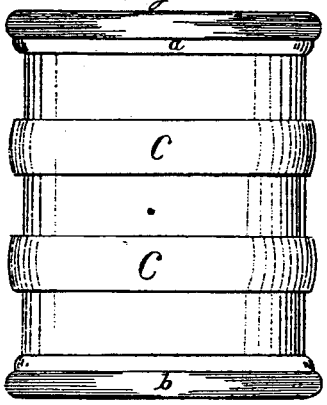
Figure 2:
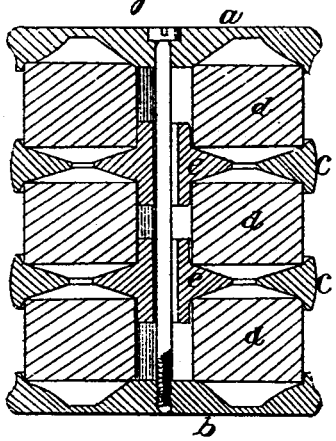
Figure 3:
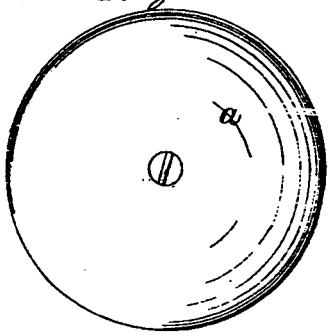

Figure 1 is a side view of my improved car-spring; Fig. 2, a longitudinal section of the same, and Fig. 3 an end view of said car-spring.

My improved car-spring is composed of alternating sections of vulcanized india-rubber and iron, the said latter sections being respectively of such a shape as to present projections for the faces of the india-rubber sections to bear against, and also air-cavities within and between the said projections, which form and arrangement of the said sections gives to my improved car-spring the advantages of the elastic properties of air and india-rubber, acting the one upon the other in a self-adjusting and ever-varying ratio.

In the accompanying drawings the india-rubber sections *d d d* of my improved car-spring are represented as being embraced between the metallic caps *a b*, and as being separated from each other by means of the rings *c c* and the central bearings, *e e*, the size and shape of the said parts being such that when no pressure is exerted upon the spring, only the angles of the outer and inner peripheries of the elastic sections *d d* come in contact with the metallic sections *c c* and *e e* of said spring, and that when pressure is exerted upon my said improved car-spring, the elastic sections *d d* are permitted to yield freely at their outer and inner peripheries, while their flat sides are forced into air-cavities between the bearing-surfaces of the said metallic sections *c c* and *e e*, thereby giving to my said car-spring the advantages of the elastic properties of air and india-rubber acting jointly the one upon the other.

The peculiar shape of the metallic sections *a b c e* of my improved car-spring, by which air-cavities are formed above and below the faces of the elastic sections *d d* at the same time that air-spaces are formed within the inner peripheries of the said elastic sections *d d*, is clearly shown in Fig. 2 of the drawings, to wit: Each of the caps *a* and *b* has a flaring annular groove formed within its inner face, which has a lip, or flange, projecting inwardly from its outer periphery that incloses the outer end of the elastic section *d* at that end of the car-spring. The cross-section of each ring *c* has the form of an outwardly-thickening wedge whose sides outwardly terminate in vertically-projecting lips or flanges, which correspond in shape and diameter with the above-mentioned flanges at the outer peripheries of the grooves in the inner faces of the caps *a b*. The form of each central section *e* is that of a short tube or thimble, which has a tapering flange radiating from the central portion of its outer periphery, the said flange corresponding in shape with that of the tapering and inwardly-projecting portion of the ring *c* which is placed immediately opposite to the said flange. The bearing-surfaces which are placed opposite the flat faces of each of the elastic sections *d d* are of such a shape that the outer and inner peripheries of said sections are left unconfined, save at their angles, consequently the compressing action which may be exerted upon the same will not be liable to produce any bursting expansion of the outer peripheries of the flat faces of the said elastic sections, while the said arrangement will also distribute the compressing force more uniformly throughout the bodies of said sections than has ever before been accomplished by any other arrangement of india-rubber sections with unelastic bearings.

In constructing my improved car-spring I shall sometimes interpose metallic plates which extend from center to circumference between the elastic sections of said spring, instead of the separated sections *c c* and *e e* that are represented in the accompanying drawings. The shape of the said metallic plates may be such as would be produced by an extension of the outer periphery of the section *e* and a union of the same with the inner periphery of section *c* represented in the accompanying drawings; or the said metallic plates which I propose to sometime employ in the construction of my improved car-spring may have projections formed upon their surfaces of any desired shape, for the elastic sections *d d* to bear against, provided the said projections are of such a shape as to leave air-spaces between them and opposite to the faces of the said elastic sections.

In the construction of my improved car-spring I do not intend to limit myself to the use of india-rubber sections, but shall employ sections of gutta-percha or of any other suitable elastic material.

What I claim as my invention, and desire to secure by Letters Patent, is—

1. Giving such a shape to the metallic sections which are interposed between the elastic sections of my improved car-spring as will produce any desired number of air cavities or spaces between the bearing-surfaces of said sections, substantially as herein set forth.

2. Giving such a shape, respectively, to the elastic and the unelastic sections of my improved car-spring as will allow the former while under pressure to yield freely at their outer and inner peripheries, while the sides of the said elastic sections are allowed to yield into air-cavities between the bearing-surfaces of the unelastic sections of said spring, substantially as herein set forth.

RICHD. VOSE.

Witnesses:
E. T. H. GIBSON,
CHARLES D. GIBSON.